United States Patent Office 2,778,601
Patented Jan. 22, 1957

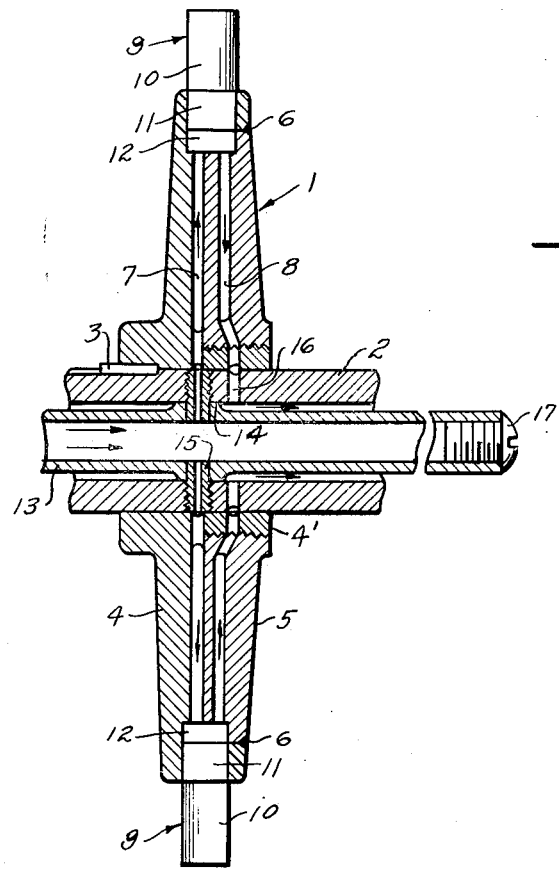
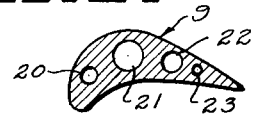
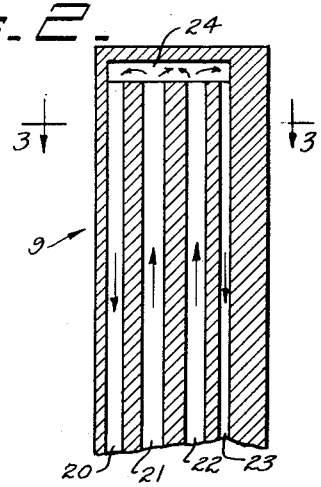
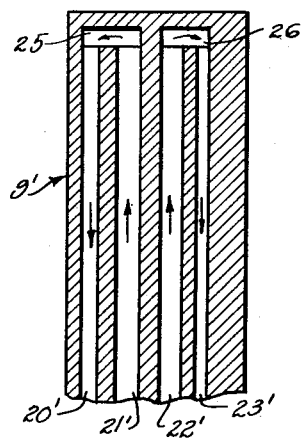
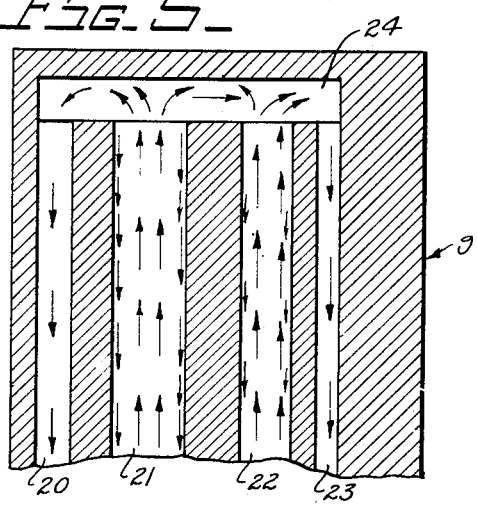

2,778,601

FLUID COOLED TURBINE BLADE CONSTRUCTION

Ernst R. G. Eckert, Xenia, Ohio, assignor to the United States of America as represented by the Secretary of the Air Force Application May 28, 1951, Serial No. 228,728

1 Claim. (Cl. 253—39.15)

(Granted under Title 35, U. S. Code (1952), sec. 266)

The invention described herein may be manufactured and used by or for the United States Government for governmental purposes without payment to me of any royalty thereon.

The present invention relates to a fluid cooled turbine blade construction and particularly to such a construction having an improved convection current flow within the blade.

The primary object of the invention is to provide a fluid cooled turbine blade having radially extending passages therein connected together at their outer ends and connected to a fluid reservoir at their inner ends with some of the passages located in relatively cool portions of the blade and other passages located in relatively warm portions of the blade, in order to establish outward flow in the cooler passages and inward flow in the warmer passages upon rapid rotation of a turbine wheel carrying a plurality of turbine blades on its outer periphery.

A further object of the invention is to provide a fluid cooled turbine blade having pairs of radially extending passages therein connected together at their outer ends and all connected to a fluid reservoir at their inner ends with one passage of each pair being located in a cooler portion of the blade than the other passage of each pair, in order to establish outward flow in the cooler passages and inward flow in the warmer passages upon rapid rotation of a turbine wheel carrying a plurality of turbine blades on its periphery.

Another object of the invention is to provide a fluid cooled turbine blade embodying an improved system of fluid circulation which operates by convection current flow.

The above and other objects of the invention will become apparent upon reading the following detailed description in conjunction with the accompanying drawing, in which:

Fig. 1 is a longitudinal cross sectional view taken through a turbine wheel and supporting shaft to show one possible arrangement of fluid circulating passages to the blades and returning therefrom.

Fig. 2 is a longitudinal cross section taken through the preferred form of fluid cooled blade.

Fig. 3 is a transverse cross section taken on line 3—3 of Fig. 2.

Fig. 4 is a longitudinal cross section taken through an alternative fluid cooled blade.

Fig. 5 is an enlarged section of the same blade illustrated in Fig. 2 but showing by the use of arrows the mode of fluid flow in the blade passages.

Water cooled turbine blades have previously been proposed and in the patent to Belluzzo No. 1,657,192 granted on January 24, 1928, there is provided a system for causing direct circulation of water under pressure outwardly through a turbine wheel and thence by U-shaped passages through the individual turbine blades and finally inwardly through the wheel to a return passage in the wheel shaft. In another system devised by Schmidt and described in "Gas Turbines and Jet Propulsion for Aircraft" by G. Geoffrey Smith (4th edition— page 64), the blades were made integral with the wheel and were drilled with several blind holes connecting at their inner ends with the water reservoir in the wheel. The cooling water fed to the reservoir is thrown radially outwards to the blades, which are the hottest part of the wheel. As the water in the blade holes becomes heated it also becomes less dense. Thus the cooler water near the center of the holes tends to flow outwardly due to centrifugal force, while the water along the sides of the holes is displaced inwardly where it mixes with the relatively cool water in the reservoir. This convection current system is dependent on providing holes of relatively large diameter, that is the holes should be 0.2 of an inch in diameter or even larger. It is not possible to provide holes of such size in all parts of the turbine blade. Where the holes are less than about 0.2 of an inch across, the warm layer of water fills most of the passage and there is no room left in the center through which cold liquid can enter the hole or passage. Then the circulation as contemplated by Schmidt decreases or stops entirely, so that the cooling effect becomes very poor.

For an explanation of the present turbine blade cooling system, particularly for use on gas turbines or other rotating parts, reference is made to the drawing. In Fig. 1 is shown a turbine wheel 1 keyed onto a hollow shaft 2 as by the spline key 3. The wheel 1 includes a main wheel disk 4 having an axial extension 4' exteriorly threaded to receive an auxiliary wheel disk or cover plate 5 having its outer rim welded at 6 to the main wheel disk. Within the composite wheel are fluid containing spaces or channels 7 and 8 in approximate parallelism and serving as cold and warm fluid channels extending to and from the blades 9 respectively. Each turbine blade 9 includes an outer section 10 exposed to hot gases and an inner root section 11 fastened securely within a recess 12 in the outer periphery of the wheel 1. Any of the conventional means may be used to key the blade root sections 11 into the recess 12. A number of these expedients are shown in an article entitled "Turbine blade fastenings" appearing on pages 148 to 153 of "Machine Design" for February 1951. It is noted that a portion of the recess 12 is unoccupied by the blade root to provide a pool or reservoir of blade cooling fluid with cooling medium, such as water, flowing thereinto by way of passage 7 and flowing therefrom by way of passage 8. The water in the reservoir tends to warm up constantly by reason of the circulation into and out of the blades, so that in order to keep the water in the reservoir reasonably cool at all times there must be constant circulation of cool water into the reservoir by way of passage 7 and this cool water merely displaces warm water from the reservoir for return flow by way of passage 8.

The hollow turbine shaft 2 contains a second hollow shaft or feed tube 13 through which cool water is fed and this inner shaft or tube is spaced from the walls of shaft 2 by means of an annular projection 14. Cooling fluid is conducted from the interior of tube 13 to the passage 7 by way of nipples 15 threaded into the main shaft 2. Return flow from passage 8 to the annular channel between shaft 2 and tube 13 is by way of holes 16 in the shaft 2. The inner tube 13 is closed off at one end by means of a cap screw 17. The water returning from the wheel may be conducted to a cooler for recirculation to the wheel by way of tube 13. By conducting the cooled water by way of the tube 13, it is kept cooler than it would if conducted through the annular space between the shaft 2 and the tube 13.

Considering now the blade construction in detail it will be noted in Fig. 2 that the blade 9 is provided with longitudinal passages 20, 21, 22 and 23 opening at their outer ends into a transverse passage 24. At their inner ends the passages 20 to 23 open into the cool water reservoir 12. The blade passages, here shown as four in number, are of varying diameters as the thickness of the blade permits (see Fig. 3), but it is to be understood that other arrangements and diameters may be chosen. The principal characteristic of the passages is that they are large in diameter near the central part of the blade, which is of airfoil cross section, and small in diameter near the leading and trailing edges of the blade. This will insure that the large passages, such as 21 and 22, will carry relatively cool water while the small passages, such as 20 and 23 will carry relatively warm water. There are two reasons for this. One reason is that the small openings are surrounded more fully by uncooled metal, while the large openings centrally of the blade are subject to heating only on the portions near the opposite side faces of the blade. The other reason is that in proportion to their volume the large openings have less wall area to cause heating of the water in the passages.

In operation the water tends to flow outwardly through the passages 21 and 22 and inwardly through the passages 20 and 23, as indicated by the arrows. This is due of course to the relatively greater density of the cooler water in the large diameter passages and also to centrifugal force developed by rapid rotation of the turbine wheel. The cooler water flowing outwardly through passages 21 and 22 will flow across the transverse passage 24 to take the place of warm water flowing inwardly through passages 20 and 23.

In a modified form of blade construction as shown in Fig. 4 the blade 9' includes longitudinal passages 20', 21', 22' and 23' paired off so as to connect at their outer ends to two transverse passages 25 and 26. Since the water flowing outwardly in the large diameter passages 21' and 22' can only return by way of the small diameter passages 20' and 23' respectively, this construction provides more orderly flow at the outer end of the blade and will tend to increase the flow rate to some extent by avoiding turbulence in the transverse flow direction.

Turning now to Fig. 5 a more detailed analysis of the flow pattern in the blade of Fig. 2 will appear. The main current of flow in the large diameter passages 21 and 22 will be outwardly at least through the core of these passages. However there will always be some tendency for hot water close to the walls of passages 21 and 22 to flow inwardly because of the lower density thereof. This is indicated by small arrows close to the walls. The cooler water from passages 21 and 22 will tend to intermix in the transverse passage 24 but the principal directions of flow will be from the passage 21 into the nearby passage 20 and from the passage 22 into the nearby passage 23. The rates of flow achieved by the system herein disclosed is ample even with relatively small passages and the flow assumes an orderly, continuous pattern. The arrangement of fluid passages as provided is particularly logical in a turbine blade, which always tapers off toward the leading and trailing edges. However the same system may be applied to other rotating parts which must be cooled. According to the principles herein disclosed, the larger diameter passages should be located in the coolest portions of the parts to be cooled. The most important feature is to provide some radial passages passing through relatively cool sections and other radial passages passing through relatively hot sections with means interconnecting the passages at their outer ends. The cross sectional shape of the cooling passages is not critical, although circular holes are probably preferred from a manufacturing standpoint.

The embodiments of the invention herein shown and described are to be regarded as illustrative only and it is to be understood that the invention is susceptible of variations, modifications and changes within the scope of the appended claims.

I claim:

A turbine blade for a turbine wheel for a combustion turbine comprising, a thin blade member including a root section at one end for mounting in the peripheral portion of the turbine wheel and including a blade section of airfoil cross section comprising the greater portion of the length of said blade member, said blade member being provided with two pairs of adjacent longitudinally extending passages with one passage of each pair being located adjacent to the central longitudinal axis of the blade member and the other passage of each pair being located adjacent to one longitudinal edge of the blade member, and means providing two separate transverse passage-connecting spaces at the outer end of the blade member to connect the passages of each pair thereof, whereby cooling fluid reaching the inner ends of said passages flows outwardly through the passages adjacent to the central longitudinal axis of the blade member when the turbine wheel is in motion in a combustion turbine and after passing along the respective transverse spaces flows inwardly through the passages adjacent to the longitudinal edges of the blade member.

References Cited in the file of this patent

UNITED STATES PATENTS

| 1,651,503 | Belluzzo | Dec. 6, 1927 |
| 1,966,104 | Noack | July 10, 1934 |
| 2,393,963 | Berger | Feb. 5, 1946 |
| 2,667,326 | Ledinegg | Jan. 26, 1954 |

FOREIGN PATENTS

| 271,742 | Switzerland | Feb. 16, 1951 |